Feb. 12, 1924.
J. W. SHEPARD
WHEEL LOCK
Filed Dec. 1, 1921
1,483,687
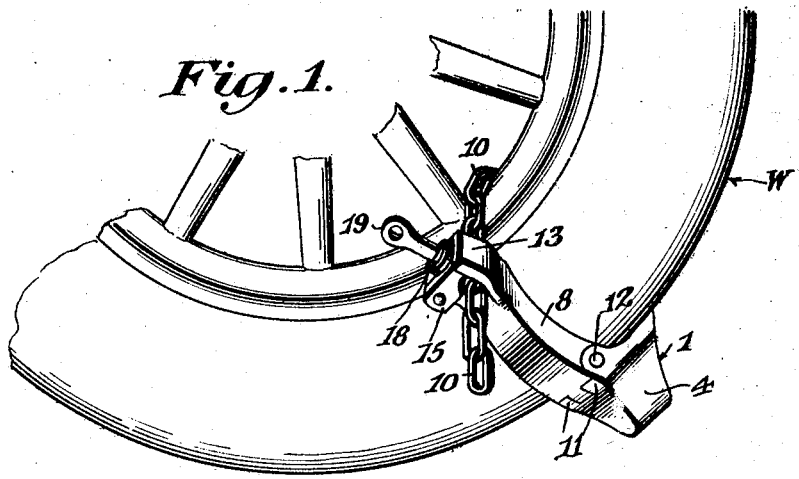
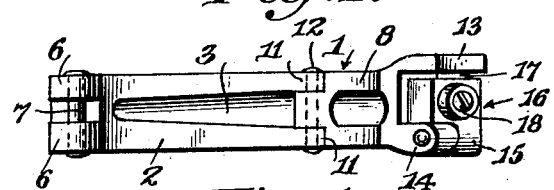
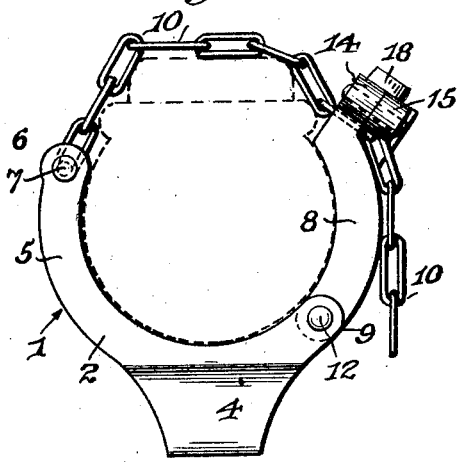
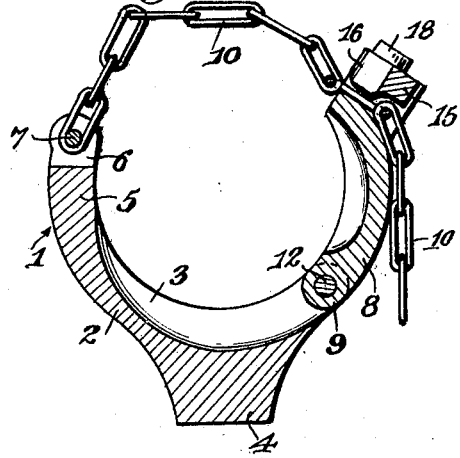
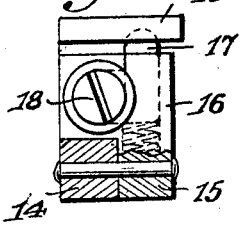
John W. Shepard, INVENTOR.
BY Geo. P. Kimmel ATTORNEY.

Patented Feb. 12, 1924.

1,483,687

UNITED STATES PATENT OFFICE.

JOHN W. SHEPARD, OF TUCSON, ARIZONA.

WHEEL LOCK.

Application filed December 1, 1921. Serial No. 519,076.

*To all whom it may concern:*

Be it known that I, JOHN W. SHEPARD, a citizen of the United States, residing at Tucson, in the county of Pima and State of Arizona, have invented certain new and useful Improvements in Wheel Locks, of which the following is a specification.

This invention relates to wheel locks in the form of a hobble, and which when applied to a wheel, will operate on the turning of the wheel to lift it once during each rotation thereof, and impart an uneven or hobbling motion to the vehicle designed to attract attention thereto, and which so obstructs the traction of the wheel that passers by would readily note the lock on the wheel and inquire as to the identity of the driver.

Another object is to provide a device of this character which operates as a chock, and when locked to the wheel cannot be manually or otherwise turned around or twisted upon the wheel.

Another object is to provide a lock of this character which while efficient in service may be constructed at a minimum cost thereby increasing its commercial possibilities.

With these and other objects in view, the invention consists in certain novel features of construction as hereinafter shown, described and claimed.

In the accompanying drawings:—

Figure 1 represents a perspective view of a portion of a vehicle wheel with the lock shown applied.

Fig. 2 is a plan view of the lock with the jaws in open position and the chain removed.

Fig. 3 is a side elevation of the lock detached and in operative position, with the wheel rim and tire shown in dotted lines.

Fig. 4 is a transverse vertical section of the lock, and

Fig. 5 is a detail sectional view partly in elevation, showing the latch for locking the hobble on the wheel.

In the embodiment illustrated, the lock or hobble 1 constituting this invention is shown applied to the rim and tire of a wheel W, and comprises a metallic casing or body 2, shaped to conform to the transverse curvature of the wheel tire in connection with which the device is to be used, and is preferably hollowed out on its inner face, as shown at 3, to lighten the construction. This body member 2, is provided on its outer face, at the bottom thereof, with a ground engaging lug 4, which preferably tapers in thickness toward its outer edge, as shown clearly in Fig. 1, and being of a size sufficient to lift the wheel, in connection with which the lock is used to cause a bumping action thereof during its travel over the ground thereby attracting attention to the fact that the lock is in use on the wheel.

The body 2, at one side has an upwardly extending side arm 5, to fit around one side of the tire and is equipped at its free end with a furcation 6, into which one end of a chain 10, is designed to extend and to be held engaged with the arm 5, by a pintle 7, passing through the end link of the chain as is shown clearly in Fig. 4.

Carried by the body 2, at the other side thereof and above the ground engaging lug 4, is a hinged arm or jaw 8, which is also curved so, as to be concentric with the tire indicated in dotted lines in Fig. 3, and shown in full lines in Fig. 1. This pivoted arm or jaw 8, is also preferably hollowed out on its inner face for the sake of lightness, and has a reduced knuckle on its hinged end, which is inserted between furcation 11, of the member 2, and secured by a pintle 12.

The free end of the jaw 8, on one side of its outer face at its free end is provided with a laterally projecting angularly disposed lug 13, and at the other side of its outer face at its free end is formed with an apertured ear 14, which is spaced from the lug 13, as well as being of less length than the length of the lug 13. Hinged to the ear 14, is a knuckle 15, carried by a latch member 16, and the latter is adapted to be shifted to the space between the lug 13 and ear 14, and is provided with a spring controlled bolt 17, adapted to enter a recess in the inner face of the lug 13, for the purpose of securing the latch member 16 in closed position, between the lug 13 and the ear 14.

The latch member 16, is of a thickness sufficient to provide for a space therebetween and the adjacent face of the jaw 8, when the latch member 16 is arranged in closed position, and which provides for the positioning of the links of the chain 10, as is clearly shown in Figs. 3 and 4. When the latch member 16 is arranged between the lug 13 and ear 14, it is extended between a pair of links of the chain 10, and over the link of the chain 10, which connects said pair of links. That link which connects the pair of links, is seated flatly upon the jaw 8, and the links of the pair are disposed at right angles with respect to the single link. The latch member 16, is cut away at one end, to provide an abutment for the outer link of the pair, so that when the latch member 16 is secured in position, the chain 10 cannot be pulled through the jaw 8, or rather pulled from between the lug 13 and the ear 14.

A suitable key releasable lock 18, is carried by the latch 16, for locking the bolt 17, engaged with lug 13, a Yale lock being preferably employed for this purpose so as to render the picking thereof difficult. A key 19, is shown in Fig. 1 which is employed for releasing the latch bolt 17, when it is desired to remove the hobble from the wheel.

In the use of this hobble, the latch 16, is opened and the chain 10, swung back to permit the members 2 and 8, to be passed around and engage the tire and rim of the wheel W, in connection with which it is to be used, as is shown clearly in Fig. 1. The chain is then brought up over the wheel rim and passed between lug 13 and the latch 16, with the link drawing the chain as tightly as possible. The link located at this point is laid flat and the latch 16, swung into closed position whereby the spring pressed bolt 17, will enter the recess in the lug 13 and the hobble be securely locked to the wheel. The chain 10 is preferably case hardened to render it proof against files or hacksaws.

Owing to the fact that the members 2 and 8, conform to the configuration of the tire and rim of the wheel all possibility of turning the hobble on the wheel is prevented.

Obviously the reverse operation of that above described is performed when it is desired to remove the hobble from the wheel by an authorized person who inserts the key 19 in the lock and releases latch 16.

As above stated, should an unauthorized person attempt to move the vehicle with this hobble applied, it will form a drag which will prevent proper operation or towing of the vehicle and even though it would be possible to move the vehicle a short distance, the hobble would indicate that an un-authorized person was attempting to use the vehicle.

I claim:—

1. A wheel lock comprising a curved body portion adopted to overlap the tire of a wheel and including a stationary arm, a shiftable arm hinged at its lower end to the lower end of the stationary arm and a ground engaging element projecting outwardly from the lower portion of the stationary arm, a lug and an ear angularly disposed with respect to and integral with the upper end of the shiftable arm and further opposing each other in spaced relation, a chain attached to the upper end of said stationary arm and extended between said ear and lug, and a releasable latching element pivoted to said ear and shiftable towards said lug to extend between a pair of links of the chain and further having means engaging in said lug for locking the body portion in position with respect to the tread of a wheel.

2. A wheel lock comprising a body portion adapted to overlap the tire of a wheel and including a pair of curved arms hinged together at their lower ends and further including a ground engaging element projecting from the lower portion of one of said arms, a lug and an ear angularly disposed with respect to and formed integral with the upper end of one of said arms and opposing each other in spaced relation, a chain attached to the upper end of the other of said arms and extended between said ear and lug, and a releasable latching element pivoted to said ear and shiftable towards said lug to extend between a pair of links of the chain and having means engaging in said lug for locking said body portion in position with respect to the tread of a wheel.

3. A wheel lock comprising a curved body portion adapted to overlap the tire of a wheel and including a stationary arm, a shiftable arm hinged at its lower end to the lower end of the stationary arm and a ground engaging element projecting outwardly from the lower portion of the stationary arm, a lug and an ear angularly disposed with respect to and integral with the upper end of the shiftable arm and further opposing each other in spaced relation, a chain attached to the upper end of said stationary arm and extended between said ear and lug, and a releasable latching element pivoted to said ear and shiftable towards said lug to extend between a pair of links of the chain and further having means engaging in said lug for locking the body portion in position with respect to the tread of a wheel, the upper end of said stationary arm being bifurcated and provided with a pin for loosely connecting the end of the chain therewith.

4. A wheel lock comprising a body portion adapted to overlap the tire of a wheel and including a pair of curved arms hinged together at their lower ends and further including a ground engaging element projecting from the lower portion of one of said arms, a lug and an ear angularly disposed with respect to and formed integral with the upper end of one of said arms and opposing each other in spaced relation, a chain attached to the upper end of the chain attached to the upper end of the other of said arms and extended between said ear and lug, and a releasable latching element pivoted to said ear and shiftable towards said lug to extend between a pair of links of the chain and having means engaging in said lug for locking said body portion in position with respect to the tread of a wheel, each end of said arm to which one end of the chain is attached being bifurcated and provided with a pin for loosely connecting the ends of said chain thereto.

5. A wheel lock comprising a curved body portion adapted to overlap the tire of a wheel and including a stationary arm, a shiftable arm hinged at its lower end to the lower end of the stationary arm and a ground engaging element projecting outwardly from the lower portion of the stationary arm, a lug and an ear angularly disposed with respect to and integral with the upper end of the shiftable arm and further opposing each other in spaced relation, a chain attached to the upper end of said stationary arm and extended between said ear and lug, and a key releasable latching element pivoted to said ear and shiftable towards said lug to extend between a pair of links of the chain and further having means engaging in said lug for locking the body portion in position with respect to the tread of a wheel.

6. A wheel lock comprising a body portion adapted to overlap the tire of a wheel and including a pair of curved arms hinged together at their lower ends and further including a ground engaging element projecting from the lower portion of one of said arms, a lug and an ear angularly disposed with respect to and formed integral with the upper end of one of said arms and and opposing each other in spaced relation, a chain attached to the upper end of the other of said arms and extended between said ear and lug, and a key releasable latching element pivoted to said ear and shiftable towards said lug to extend between a pair of links of the chain and having means engaging in said lug for locking said body portion in position with respect to the tread of a wheel.

7. A wheel lock comprising a curved body portion adapted to overlap the tire of a wheel and including a stationary arm, a shiftable arm hinged at its lower end to the lower end of the stationary arm and a ground engaging element projecting outwardly from the lower portion of the stationary arm, a lug and an ear angularly disposed with respect to and integral with the upper end of the shiftable arm and further opposing each other in spaced relation, a chain attached to the upper end of said stationary arm and extended between said ear and lug, and a key releasable latching element pivoted to said ear and shiftable towards said lug to extend between a pair of links of the chain and further having means engaging in said lug for locking the body portion in position with respect to the tread of a wheel, the upper end of said stationary arm being bifurcated and provided with a pin for loosely connecting the end of the chain therewith.

8. A wheel lock comprising a body portion adapted to overlap the tire of a wheel and including a pair of curved arms hinged together at their lower ends and further including a ground engaging element projecting from the lower portion of one of said arms, a lug and an ear angularly disposed with respect to and formed integral with the upper end of one of said arms and opposing each other in spaced relation, a chain attached to the upper end of the other of said arms and extended between said ear and lug, and a key releasable latching element pivoted to said ear and shiftable towards said lug to extend between a pair of links of the chain and having means engaging in said lug for locking said body portion in position with respect to the tread of a wheel, each end of said arm to which one end of the chain is attached being bifurcated and provided with a pin for loosely connecting the ends of said chain thereto.

In testimony whereof, I affix my signature hereto.

JOHN W. SHEPARD.